(No Model.)  5 Sheets—Sheet 1.
C. P. HIGGINS.
EMBOSSING AND PUNCHING MACHINE.
No. 503,963.  Patented Aug. 29, 1893.
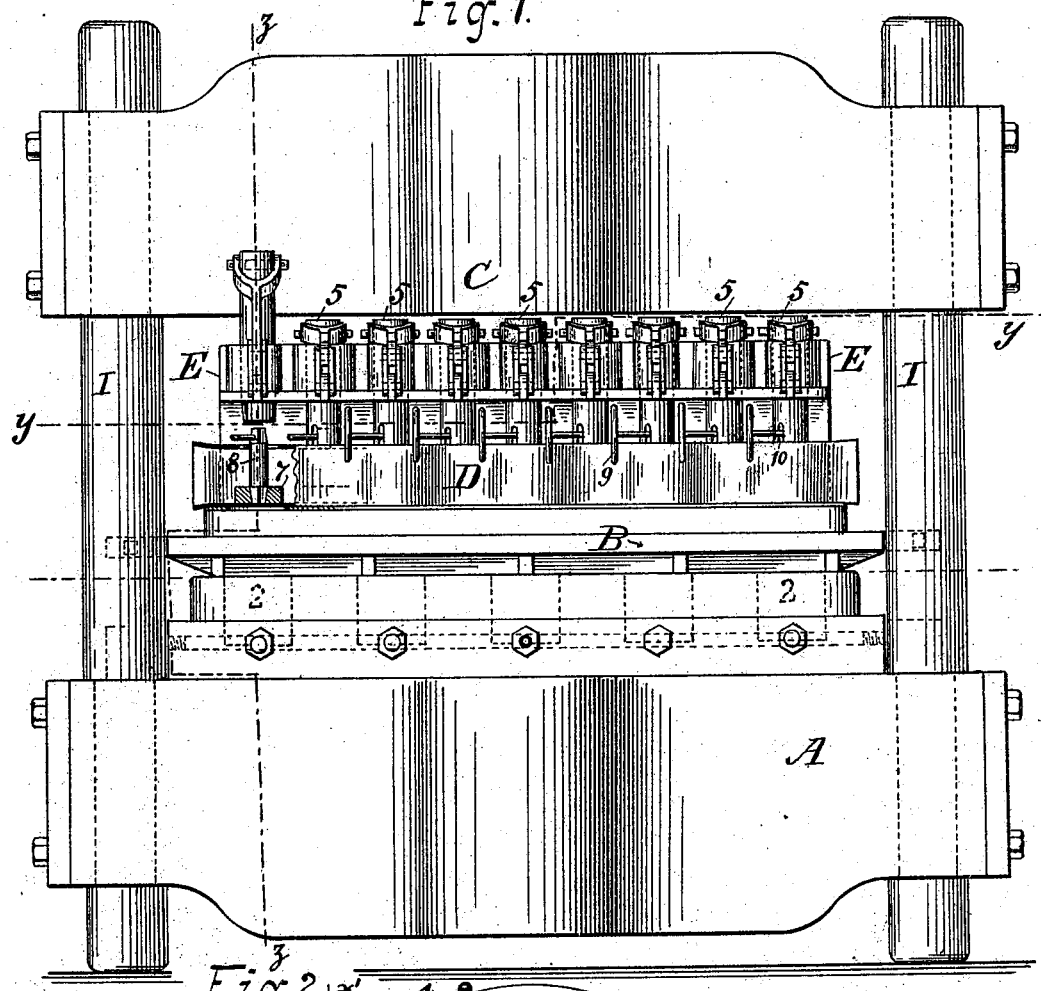
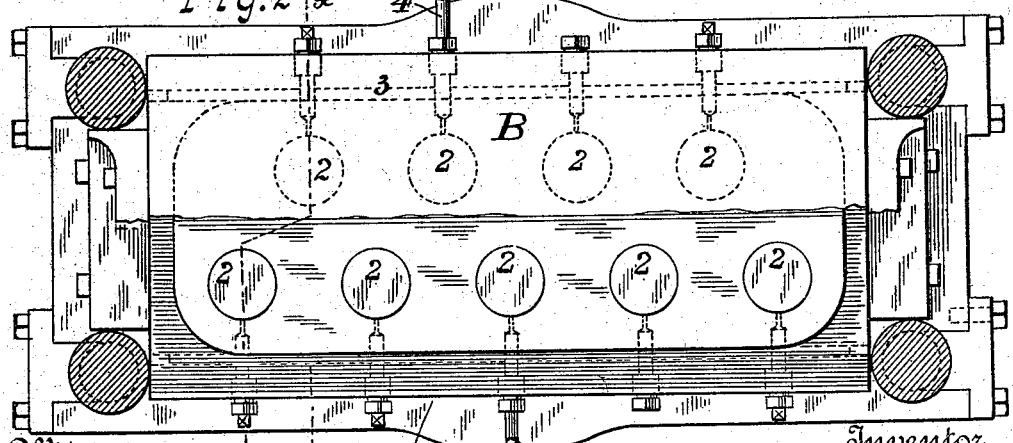

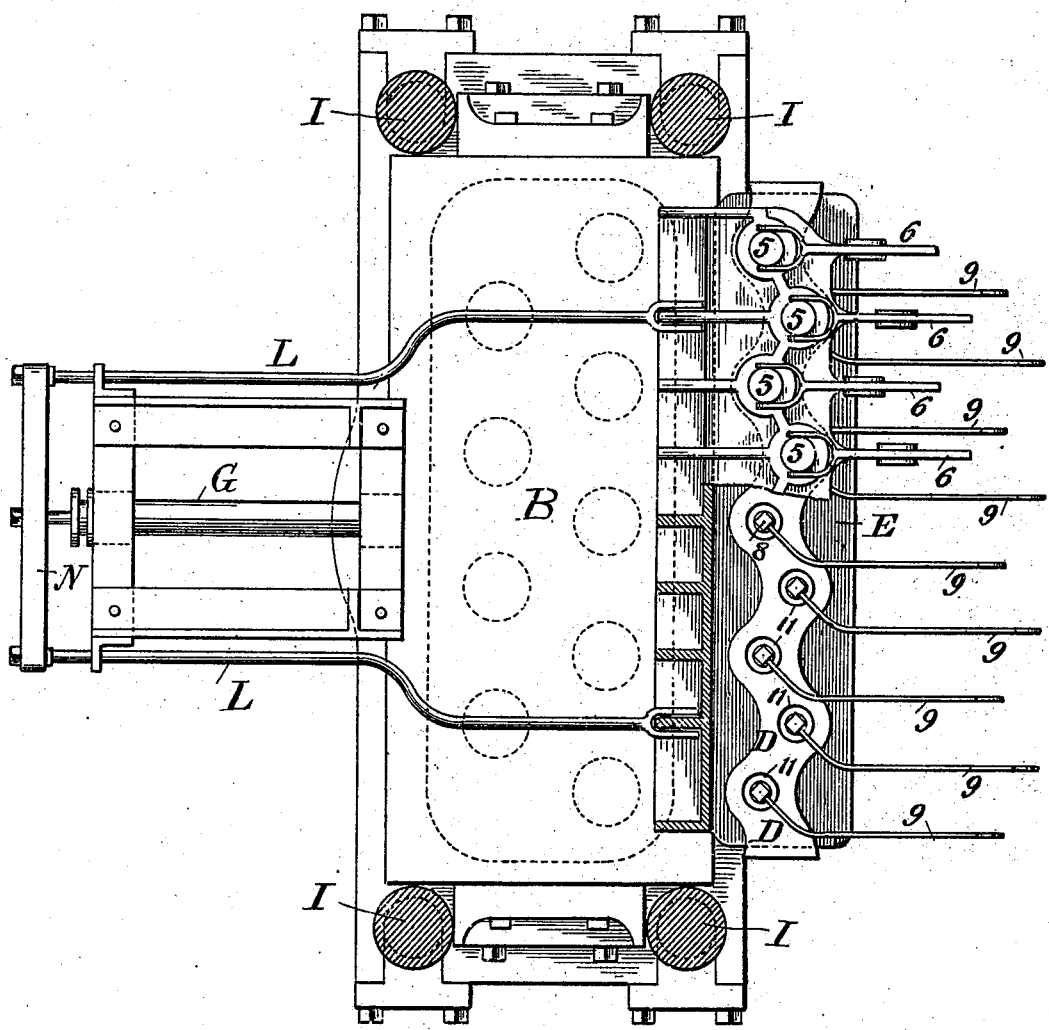

(No Model.)
5 Sheets—Sheet 3.
C. P. HIGGINS.
EMBOSSING AND PUNCHING MACHINE.
No. 503,963. Patented Aug. 29, 1893.
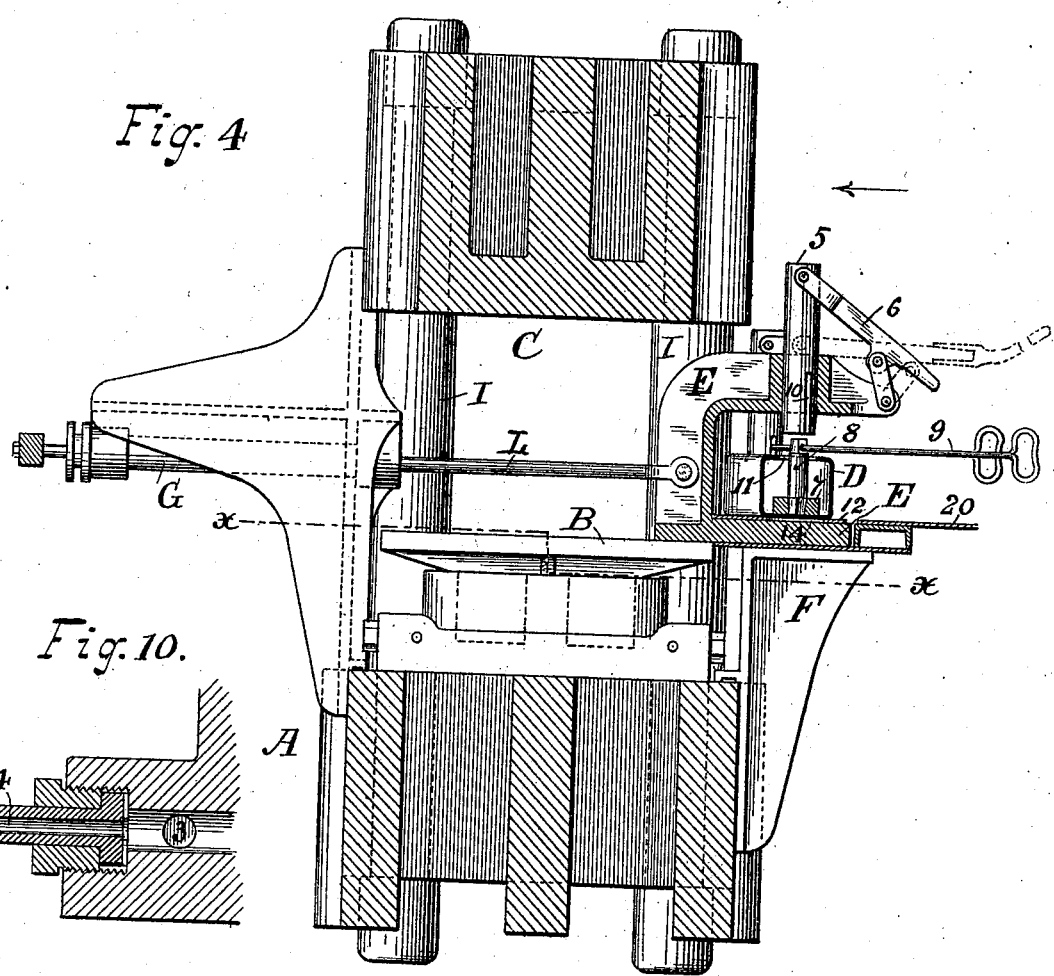
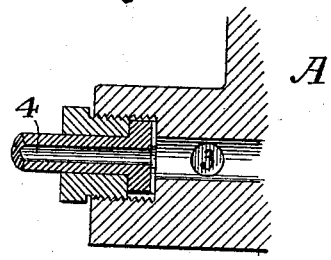
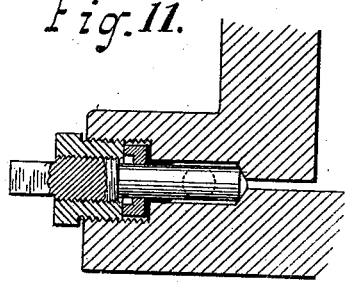
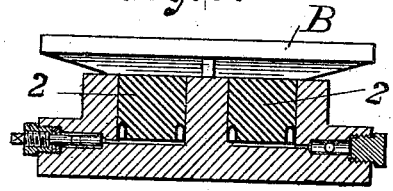
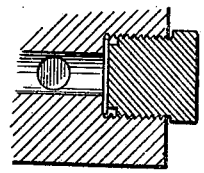
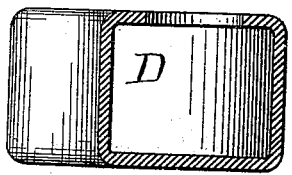
Witnesses
Chas Hanimann
N. Marler
Inventor
Campbell P. Higgins
By his Attorney
Chas. W. Forbes (No Model.)  5 Sheets—Sheet 4.
C. P. HIGGINS.
EMBOSSING AND PUNCHING MACHINE.

No. 503,963. Patented Aug. 29, 1893.

Witnesses
Chas. Hanimann
H. Marler

Inventor
Campbell P. Higgins
By his Attorney
Chas. W. Forbes (No Model.) 5 Sheets—Sheet 5.

C. P. HIGGINS.
EMBOSSING AND PUNCHING MACHINE.

No. 503,963. Patented Aug. 29, 1893.

UNITED STATES PATENT OFFICE.

CAMPBELL P. HIGGINS, OF NEW YORK, N. Y.

EMBOSSING AND PUNCHING MACHINE.

SPECIFICATION forming part of Letters Patent No. 503,963, dated August 29, 1893.

Application filed July 5, 1892. Serial No. 439,062. (No model.)

*To all whom it may concern:*

Be it known that I, CAMPBELL P. HIGGINS, a citizen of the United States, residing in the city, county, and State of New York, have invented certain new and useful Improvements in Embossing and Punching Machines, of which the following is a specification.

The invention is adapted for use in the embossing and punching of metal or other plates wherein the surface to be acted upon is inaccessible by reason of a superstructure adjacent to or above such surface.

The invention especially relates to the embossing of the sides of corrugated or serpentine tubular headers adapted for sectional steam boilers; the embossing being effected through and opposite the tube holes made after the header is formed, and preparatory to making the hand holes.

In order that others may understand and practice the invention, I will first proceed to describe a machine embodying the same and subsequently point out in the claims its novel characteristics.

Figure 5:
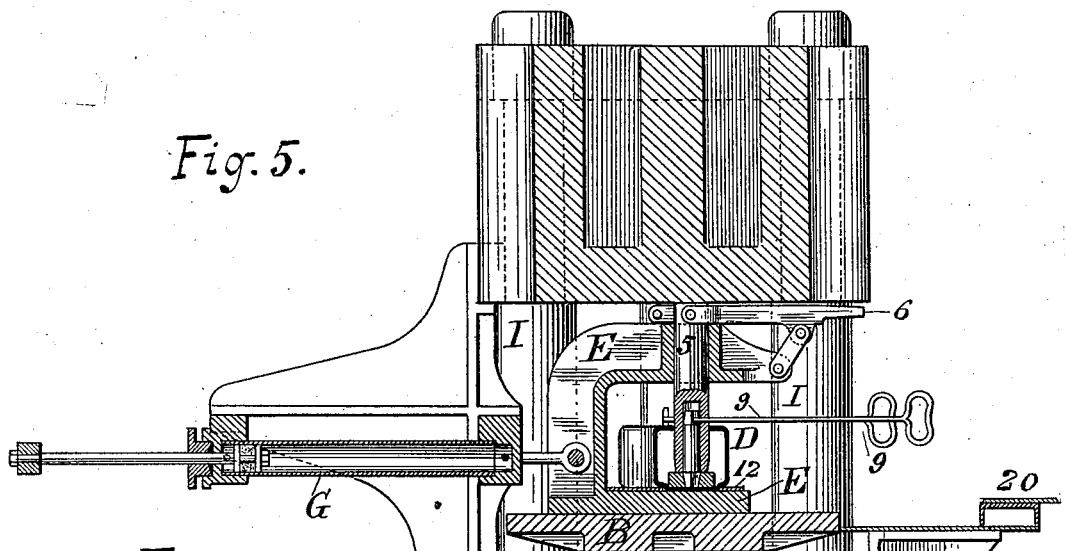
Figure 9:
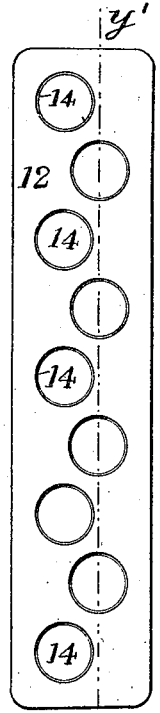
Figure 8:
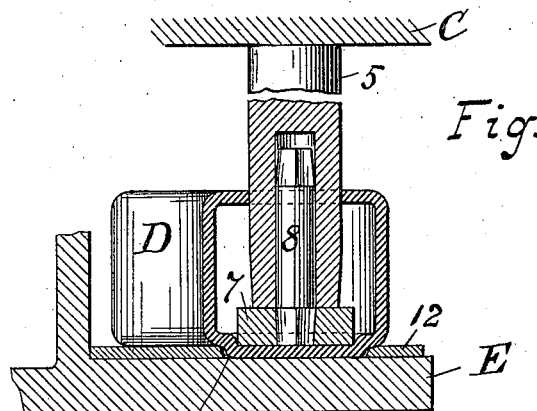
Figure 13:
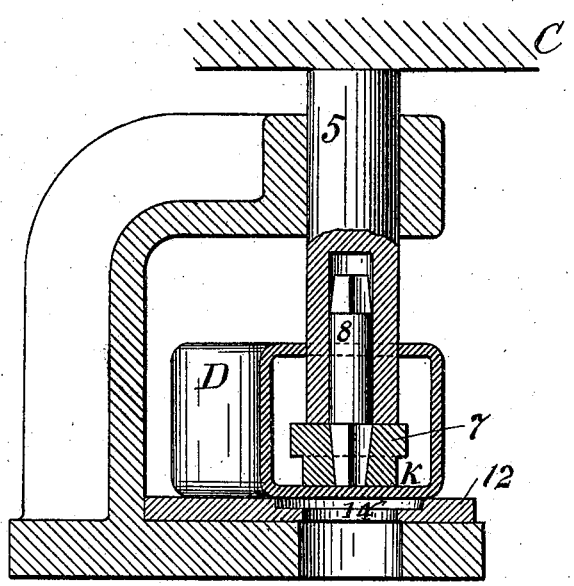
Figure 14:
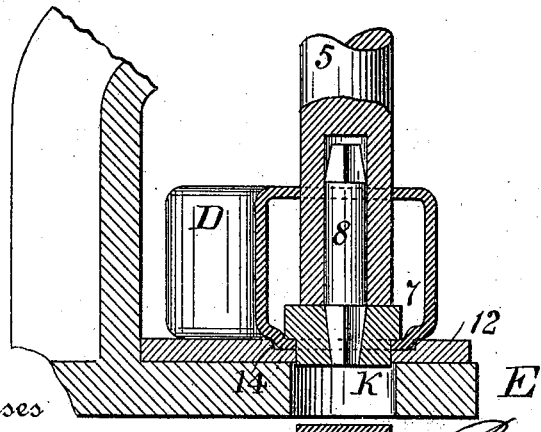

Referring to the accompanying drawings, in which similar characters of reference indicate corresponding parts throughout:—Figure 1, is a front elevation of the machine; Fig. 2, a horizontal section on the line $x$—$x$, Fig. 4; Fig. 3, a horizontal section taken on the line $y$—$y$ Fig. 1; Fig. 4, a cross-sectional elevation taken on the line $z$—$z$, Fig. 1; Fig. 5, a similar cross-sectional elevation, showing the parts in different positions, and the platen in section; Fig. 6, a detail sectional view taken on the line $x'$—$x'$, Fig. 2; Fig. 7, an enlarged cross-section showing the header before it is embossed; Fig. 8, an enlarged cross-section showing the header after it is embossed, and also sectionally showing the dies after the act of impression. Fig. 9, is a plan view on the same scale as Figs. 1 to 5 inclusive, showing the lower side of the press, and also including a longitudinal section of the same on the line $y'$—$y'$. Figs. 10 to 12 inclusive, are enlarged detail sectional views, showing various hydraulic connecting and shutting off devices adapted to the channels of the press, and Figs. 13 and 14 are enlarged cross-sectional views of the dies and punch extension.

A, represents the frame of the press; I supporting columns; C, the stationary head; and B, the movable head or platen actuated by hydraulic plungers 2. The hydraulic plungers 2, are arranged in staggered series as expedient to distributing the pressure as equally as possible throughout the plate B, and these plungers or any desired portion of their number are actuated by the admission of water through the channels 3, supplied by the tubes 4, Figs. 2 and 10. Any of the plungers 2, may be cut out of action by removal of the supply pipe 4, and the insertion of a plug adapted to stop off their channels as shown in Fig. 11; the purpose being that of operating the press to emboss only a portion of the header if desired.

D, indicates the header to be embossed, and E, Figs. 3 and 4, is a die carrier which may be moved from the sill F, onto or off the platen B, by means of the auxiliary hydraulic cylinder G, connected by the rods L and cross head N, as indicated in Fig. 3, or by other suitable means.

In the upper part of the die carrier E, there is a series of rams 5, which may be raised vertically by the hand levers 6, as shown in Fig. 4. The upper dies are composed of steel disks 7, corresponding with the inside contour to be embossed, which are inserted through the open ends of the tube D, and approximately centered by the squared pins 8, manipulated by rods 9. The lower ends of the rams 5, are bored to fit the pins 8, as seen in Figs. 5 and 8, and slots 10, are provided in the sides of the rams adapted to receive the rod 9, so that the said rams, which exactly fit the bores 11, in the header, may be inserted therein to accurately center and abut upon the dies 7. The lower die is composed of a steel plate 12, in the base of the die carrier E, having holes 14, located and contoured to correspond to the relief side of the embossment opposite the dies 7 and beneath the holes 11, in the header.

In the embossing operation, the header D, after being suitably heated is placed on a table 20, (Fig. 4,) in front of the die carrier, and the upper dies or disks 7, inserted into the open ends of the header; the squared guide pins 8 are then passed down through the tube holes 11 by means of the rods 9, so that the said guide pins rest in the disks 7. The rams 5, are then raised and the header placed in the die carrier as seen in Figs. 1, 3 and 4, and the said rams dropped in place through the tube holes and over the guide pins 8, thus bringing the disks 7, all into a concentric position with the holes in the die 12, beneath the header. Water is applied to the cylinder G, drawing the die carrier into the press as at Fig. 5, subsequent to which the platen B, of the press is advanced by the plungers 2, 2, with the requisite pressure to emboss the header; the finished form appearing in Fig. 8.

In Figs. 13 and 14, the machine is adapted to effect the embossing and punching operations at a single stroke of the ram 5, the die 12 being thickened and provided with a countersunk recess and aperture 14 that is extended through the die carrier E. With this construction the die 7 is either made with an extension $k$, in one piece, or with the extension in a separate piece, centered and held by the extended pins 8, as shown, the die in its first movement assisting in performing the embossing operation and punches the hand hole at the same time; the upper part 7, of the die, completing the formation of the embossed seat as shown in Fig. 14. Should it be desired to emboss a portion only of the series shown, the corresponding dies 7, may obviously be omitted; the rams or crowns 5, corresponding thereto remaining idle during the action of the remaining ones.

Having thus described my invention, what I claim, and desire to secure by Letters Patent, is—

1. In a machine for embossing tubular headers having a multiple die composed of a perforated plate arranged exterior to the header, a cooperating forming disk arranged within the header and independently acting retractible rams or crowns, with means for operating the same separately or together whereby one or a series of the same may be operated at will substantially as described.

2. In a machine for embossing tubular headers, a multiple die composed of a perforated plate arranged exterior to the header, a cooperating forming disk arranged within the header and a ram adapted for insertion through the tube holes of the header acting upon said disk, and means for centering said disk with the ram when the latter is advanced, substantially as described.

3. In a machine for embossing tubular headers, a perforated die exterior to the header, a disk interior thereto, a hollow ram aligned with the said perforated die, and provided with a pin to center the disk with the said perforated die and ram when the latter is advanced, substantially as described.

4. In a machine for embossing and punching tubular headers, a throughway die exterior to the header constructed with a marginal countersunk recess, a removable differential disk adapted for insertion within the headers corresponding to the recess and aperture of the exterior die, and a ram acting upon the interior disk, substantially as described.

CAMPBELL P. HIGGINS.

Witnesses:
NAT. M. PRATT,
FRANCIS L. WARD.